United States Patent
Oh et al.

(10) Patent No.: US 9,349,065 B2
(45) Date of Patent: May 24, 2016

(54) METHOD FOR TRACKING MULTIPLE IMAGE OBJECTS BASED ON A PENALTY GRAPH FOR AVOIDING HIJACKING OF A TRACKER

(75) Inventors: Chi Min Oh, Gwangju (KR); Jong Gu Kim, Jeollanam-do (KR); Yung Ho Seo, Gwangju (KR); Chil Woo Lee, Gwangju (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 74 days.

(21) Appl. No.: 14/234,207

(22) PCT Filed: Jul. 25, 2012

(86) PCT No.: PCT/KR2012/005905
§ 371 (c)(1),
(2), (4) Date: Jan. 22, 2014

(87) PCT Pub. No.: WO2013/015601
PCT Pub. Date: Jan. 31, 2013

(65) Prior Publication Data
US 2014/0177923 A1 Jun. 26, 2014

(30) Foreign Application Priority Data

Jul. 28, 2011 (KR) .................. 10-2011-0075049

(51) Int. Cl.
*G06K 9/32* (2006.01)
*G06T 7/20* (2006.01)

(52) U.S. Cl.
CPC .............. *G06K 9/3241* (2013.01); *G06T 7/208* (2013.01); *G06T 2207/10016* (2013.01)

(58) Field of Classification Search
CPC ......... G06T 7/004; G06T 7/0048; G06T 7/20; G06T 7/208; G06T 2207/20076; G06T 2207/30232; G06T 2207/30241; G06K 2209/21
See application file for complete search history.

(56) References Cited

U.S. PATENT DOCUMENTS

2008/0063236 A1* 3/2008 Ikenoue et al. ............... 382/103

FOREIGN PATENT DOCUMENTS

| JP | 2007-328746 A | 12/2007 |
| JP | 2008-257526 A | 10/2008 |
| KR | 10-0635883 B1 | 10/2006 |
| KR | 10-2009-0043016 A | 5/2009 |

OTHER PUBLICATIONS

International Search Report for PCT/KR2012/005905, dated Nov. 28, 2012.

* cited by examiner

*Primary Examiner* — Andrew W Johns
(74) *Attorney, Agent, or Firm* — The PL Law Group, PLLC

(57) ABSTRACT

A method for tracking multiple image objects, includes resampling particles from each of the image objects tracked in a previous image, calculating respective weights of the resampled particles, and predicting and tracking locations of the image objects in a current image based on values obtained by multiplying the locations of the particles by corresponding weights, wherein when an image object of the previous image has a neighboring image object located within a threshold distance, weights of the particles sampled from the image object are calculated by multiplying image values of the current image by penalties, which are values of distances between the corresponding particles and the neighboring image object. The method is capable of avoiding a hijacking problem in which identifiers of nearby objects are confused with each other or disappear during the tracking of multiple objects.

9 Claims, 3 Drawing Sheets

METHOD FOR TRACKING MULTIPLE IMAGE OBJECTS BASED ON A PENALTY GRAPH FOR AVOIDING HIJACKING OF A TRACKER

CROSS REFERENCE TO RELATED APPLICATIONS AND CLAIM OF PRIORITY

This patent application is a National Phase application under 35 U.S.C. §371 of International Application No. PCT/KR2012/005905, filed 25 Jul. 2012, which claims priority to Korean Patent Application number 10-2011-0075049, filed 28 Jul. 2011, entire contents of which are incorporated herein by reference.

BACKGROUND

1. Field of the Invention

The present invention relates to a method for tracking multiple image objects, and more particularly, to a method for tracking multiple image objects based on a penalty graph in order to avoid hijacking of a tracker, which is capable of avoiding a hijacking problem wherein the identifiers of nearby objects are confused with each other or disappear during the tracking of multiple objects.

2. Description of the Related Art

Generally, a technology for tracking multiple image objects is a technology related to human computer interaction (HCI). Recently, with an increase in the number of devices using a multi-touch scheme, such as tabletop displays, smart phones and smart TVs, the technology has attracted attention. In order to provide a more intuitive interface, the technology has been widely used in the field of multi-touch tracking.

Furthermore, a technology for tracking multiple image objects is a technology that assigns respective pieces of identification information to multiple touch regions generated by multiple touches and enables the same identification numbers to be consistently assigned even when the touch regions move.

However, the conventional technology for tracking multiple image objects only performs tracking based on the previous location of an object. Accordingly, when image objects are located adjacent to each other, the image objects are recognized as a single image object. As a result, a problem arises wherein the identification information of any one of the image objects may disappear, the pieces of identification information of the two image objects may be replaced with each other, or a tracker hijacking phenomenon occurs in which a single object may incorporate the two pieces of identification information.

SUMMARY

With research efforts to prevent hijacking phenomenon upon image object tracking and increasing the success rate of tracking multiple image objects, the inventors have developed a technical configuration of a method for tracking multiple image objects, which is capable of calculating weights while considering the distances between adjacent image objects, thereby preventing image objects from being recognized as a single object and also preventing pieces of identification information from being replaced with each other.

Accordingly, in one embodiment of the present invention is provided a method for tracking multiple image objects, capable of preventing a hijacking phenomenon upon image object tracking, thereby increasing the success rate of tracking multiple image objects.

Embodiments of the present invention are not limited to the above-described embodiments, and aspects that have not been described will be clearly understood by those skilled in the art from the following detailed description.

Embodiments of the present invention provide a method for tracking multiple image objects, the method including resampling particles from each of image objects tracked in a previous image, calculating respective weights of the resampled particles, and predicting and tracking locations of the image objects in a current image based on values obtained by multiplying locations of the particles by corresponding weights, wherein when an image object of the previous image has a neighboring image object located within a threshold distance, the weights of particles sampled from the image object are calculated by multiplying the image values of the current image by penalties, which are the values of the distances between the corresponding particles and the neighboring image object.

In one embodiment, the penalties are values between "0" and "1," the penalties of particles located within the threshold distance from the neighboring image object are calculated as "1," and the values of the distances of particles that are superimposed on the neighboring image object at the same location are calculated as "0"; and the penalties of particles located closer to the neighboring image object within the threshold distance are calculated as a value closer to "0".

In one embodiment, the location of the image object in the current image is predicted as an average value of locations that are obtained by multiplying the locations of the particles by the corresponding weights.

In another embodiment, the method further includes, after tracking the locations of the image objects in the previous image, determining whether each of the image objects has a neighboring image object located within the threshold distance, and creating a penalty graph including a location coordinate set for the first image objects, that is, image objects having neighboring image objects, and an edge information set, that is, information indicating that location coordinates for the first image object have been mapped to location coordinates for the neighboring image objects of the first image objects; wherein the penalties for particles of the first image objects present within the location coordinate set are calculated as the values of the distances to the neighboring image objects designated by the edge information of the first image objects.

In a preferred embodiment, the penalty graph is calculated using the following Equations:

$$G=(V,E)$$

$$V=\{X_{1,t},X_{2,t},X_{3,t},X_{4,t}\}$$

$$E=\{(X_{1,t},X_{2,t}),(X_{3,t},X_{4,t})\}$$

where G is the penalty graph, V is a location coordinate set, E is an edge information set, $X_{i,t}$ is the first image object, and $X_{j,t}$ is the neighboring image object.

In yet another embodiment, the method further includes, after tracking the locations of the image objects in the current image, updating the penalty graph with respect to the tracked image objects and then using the updated penalty graph as a basis for the calculation of the penalties upon tracking the locations of the image objects in a subsequent image.

Furthermore, the present invention provides a medium having a multiple image object-tracking program stored thereon, the multiple image object-tracking program performing the method for tracking multiple image objects by using a computer to perform or manipulate or implement the multiple image object-tracking program.

Furthermore, the present invention provides a server system having the multiple image object-tracking program stored thereon, the server system transmitting the multiple image object tracking program over a communication network.

Moreover, the present invention provides a computer system having the multiple image object-tracking program installed thereon, the computer system performing the method for tracking multiple image objects.

The present invention has the following excellent advantage.

In accordance with the method for tracking multiple image objects according to the present invention, penalties inversely proportional to the distances to a neighboring image object, that is, an adjacent image object, are added to the weights of particles using a penalty graph, and thus an update is made such that the location of each image object is not excessively close to the location of the neighboring image object, thereby preventing a hijacking phenomenon upon object tracking.

DETAILED DESCRIPTION

Figure 1:
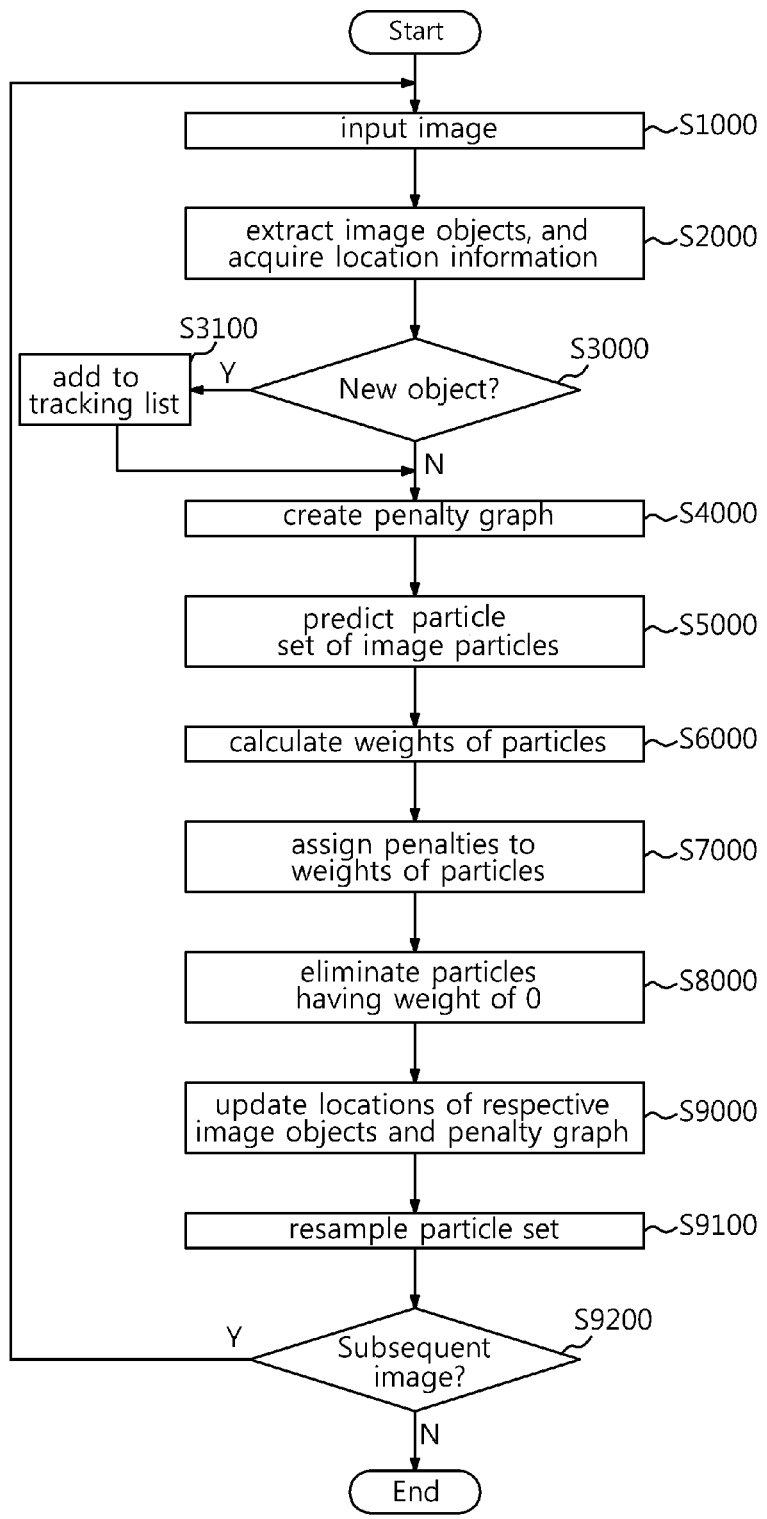
FIG. 1 is a flowchart for the method for tracking multiple image objects according to one embodiment of the present invention.

Although general terms are used as terms within the present invention as much as possible, there are some terms that are selected by the applicant, as needed in specific situations, wherein the meanings of the terms should be determined based on the meanings described or used in the detailed description of the present invention, in lieu of the simple names of the terms.

The technological configuration of the present invention will be described in detail below with reference to embodiments illustrated in the accompanying drawings.

However, the present invention is not limited to the embodiments described herein, but may also be embodied in other forms. Throughout the specification, the same reference numerals designate the same components.

Referring to FIG. 1, the method for tracking multiple image objects according to one embodiment of the present invention is intended to track objects having location information in a two-dimensional (2D) plane. Although in the present invention, the tracking image objects, that is, touch points 11, on a touch screen 10 are taken as an example, the present invention may be applicable to any type of technology for tracking objects having location information in a 2D plane, such as technology for tracking the movement of objects on a satellite photo, or technology for tracking the movement of objects in a surveillance image for security, or the like.

Furthermore, the method for tracking multiple image objects according to one embodiment of the present invention is performed in such a way that a computer system with a multiple image object-tracking program installed thereon functions as a computer system capable of performing the manipulations or implementations of the multiple image object-tracking program. The computer system may receive the program from a computer-readable medium or a server system connected over a communication network, may install the program, and may perform the tracking of multiple image objects.

Furthermore, the method for tracking multiple image objects according to this embodiment of the present invention is applicable to all methods for resampling particles from an image object tracked in a previous image, and assigning weights to the resampled particles, thereby predicting an image object of a current image from the particles assigned the weights, such as the method of a particle filer.

First, a current image is input at step S1000.

Figure 2:
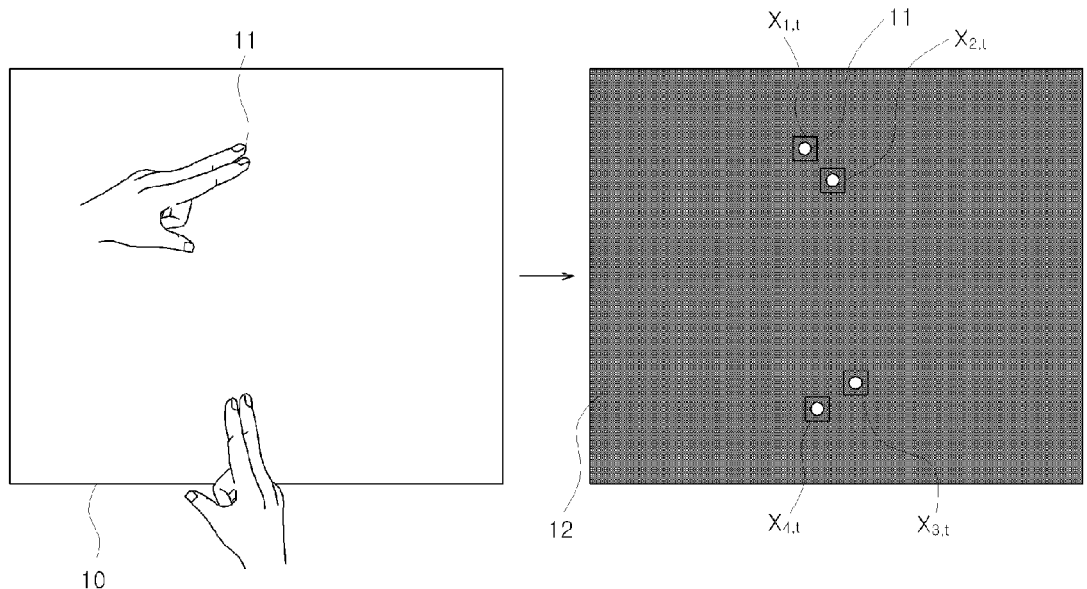
FIG. 2 is a diagram illustrating image objects that are targets for tracking in the method for tracking multiple image objects according to one embodiment of the present invention.

Furthermore, referring to FIG. 2, in circumstances where the current image is an image input into the touch screen 10, the following image object extraction and location information acquisition steps may be omitted when the touch screen 10 itself creates the location information of touch points 11, that is, objects to be tracked, and outputs the location information. The targets of tracking may be specific objects having location information, other than image objects.

Thereafter, image objects $X_{1,t}$, $X_{2,t}$, $X_{3,t}$, and $X_{4,t}$ are extracted from the current image and then the location information thereof is acquired at step S2000.

Furthermore, in the present invention, the locations of the image objects $X_{1,t}$, $X_{2,t}$, $X_{3,t}$, and $X_{4,t}$ are extracted using an integral image. The integral image is obtained from a binary image wherein pixels in a region 12 having no object have a pixel value of "0", and pixels in a region having an object have a pixel value of "1."

That is, the locations of a region having many white pixels in a binary image are extracted as the image objects $X_{1,t}$, $X_{2,t}$, $X_{3,t}$, and $X_{4,t}$.

In the present invention, the image objects $X_{1,t}$, $X_{2,t}$, $X_{3,t}$, and $X_{4,t}$ are extracted as rectangular regions that surround the outsides of the touch points.

Furthermore, the extracted image objects $X_{1,t}$, $X_{2,t}$, $X_{3,t}$, and $X_{4,t}$ are registered in a tracking list, and are labeled with different identifiers (IDs).

However, if object tracking has been performed on a previous image, it is then determined whether there is a new object at step S3000. If there is a new object, the new object is registered in a tracking list and then labeled with a new ID at step S3100.

Thereafter, a penalty graph G is created at step S4000.

Furthermore, the penalty graph G is defined as information having a location coordinate set V and an edge information set E, the location coordinate set V is defined as a set of image objects that belong to the image objects $X_{1,t}$, $X_{2,t}$, $X_{3,t}$, and $X_{4,t}$ and that each have a neighboring image object, that is, another image object, within a threshold distance C, and the edge information set E is defined as a set of pairs of image objects wherein image objects present within the threshold distance C have been paired with each other.

Figure 3:
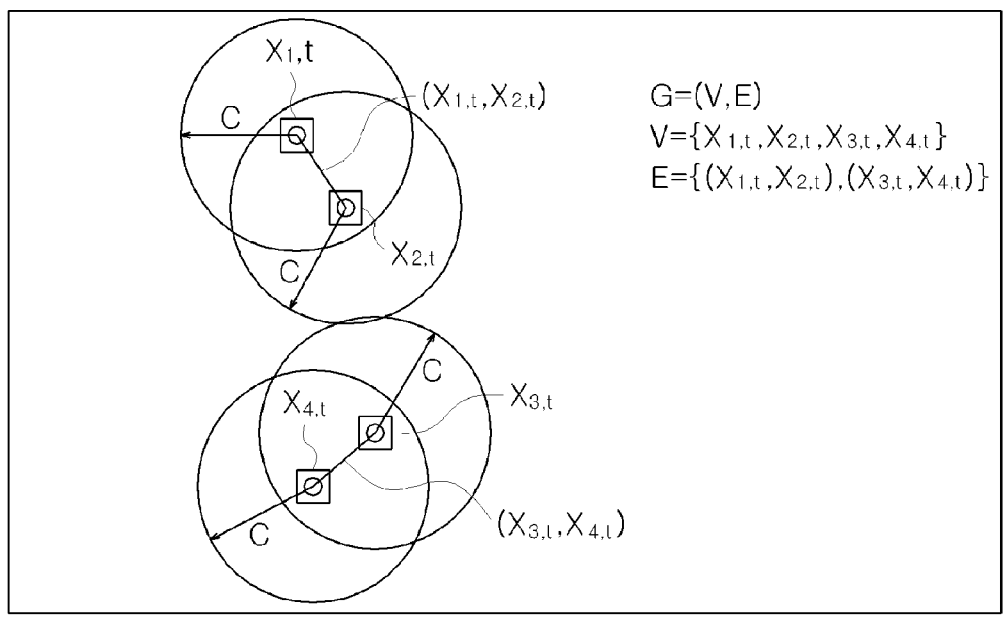
FIG. 3 is a diagram illustrating a penalty graph in the method for tracking multiple image objects according to one embodiment of the present invention.

Furthermore, referring to FIG. 3, in one embodiment of the present invention, the first image object $X_{1,t}$ and the second image object $X_{2,t}$ are present within the threshold distance C from each other, and the third image object $X_{3,t}$ and the fourth image object $X_{4,t}$ are present within the threshold distance C from each other. The penalty graph G may be represented by the following Equation 1, the location coordinate set V is calculated as a set having four location coordinates, as represented by the following Equation 2, and the edge information set E is calculated as a set of a pair $(X_{1,t}, X_{2,t})$ in which the first image object $X_{1,t}$ and the second image object $X_{2,t}$ have been paired, and another pair $(X_{3,t}, X_{4,t})$ in which the third image object $X_{3,t}$ and the fourth image object $X_{4,t}$ have been paired, that is, a set of two pairs of image objects, as represented by the following Equation 3.

$$G = (V, E) \quad (1)$$

$$V = \{X_{1,t}, X_{2,t}, X_{3,t}, X_{4,t}\} \quad (2)$$

$$E = \{(X_{1,t}, X_{2,t}), (X_{3,t}, X_{4,t})\} \quad (3)$$

That is, the penalty graph G has information about image objects within the threshold distance C from the image objects $X_{1,t}$, $X_{2,t}$, $X_{3,t}$, and $X_{4,t}$ and information about neighboring image objects adjacent to the image objects.

Thereafter, the particle set of each of the image objects $X_{1,t}$, $X_{2,t}$, $X_{3,t}$, and $X_{4,t}$ is predicted at step S5000.

Furthermore, the particle set of each of the image objects $X_{1,t}$, $X_{2,t}$, $X_{3,t}$, and $X_{4,t}$ is created as a value that is obtained by adding a Gaussian random variable $\epsilon$ to the location (x,y) of each of the image objects.

That is, the particle set is a set of objects each having location information indicative of being away from a corresponding image object using the Gaussian random variable.

However, when a set of resampled particles are present in a previous image, the Gaussian random variable is added to each of the particles, and thus the set may be predicted as a particle set in a current image.

Thereafter, the particle weights of the predicted particles are calculated at step S6000.

Furthermore, the particle weights are assigned at the locations of the particles in proportion to the brightness of an image. In greater detail, the particles are substantially 2D location coordinates. Accordingly, a region of a specific size is set around the location of each of the particles, a weight for a region having many white pixels, that is, a region having many pixel values of "1" in a binary image, is calculated as a large value, and a weight for a region having a few pixel values of "1" is calculated as a small value.

Furthermore, the weights are values between "0" and "1", and normalization is performed such that the sum of the weights of all the particles becomes "1".

Thereafter, penalties are assigned to the weights at step S7000.

Furthermore, step S7000 for calculating penalties is a core step of the present invention, along with step S4000 for creating a penalty graph G. This is the step where, when an image object that is the basis of particle prediction has a neighboring image object, a penalty inversely proportional to the distance between each particle and the neighboring image object is calculated and multiplied by a weight, so that weights for particles closer to a neighboring image object are calculated as small values and weights for particles farther from the neighboring image object are calculated as large values.

Figure 4:
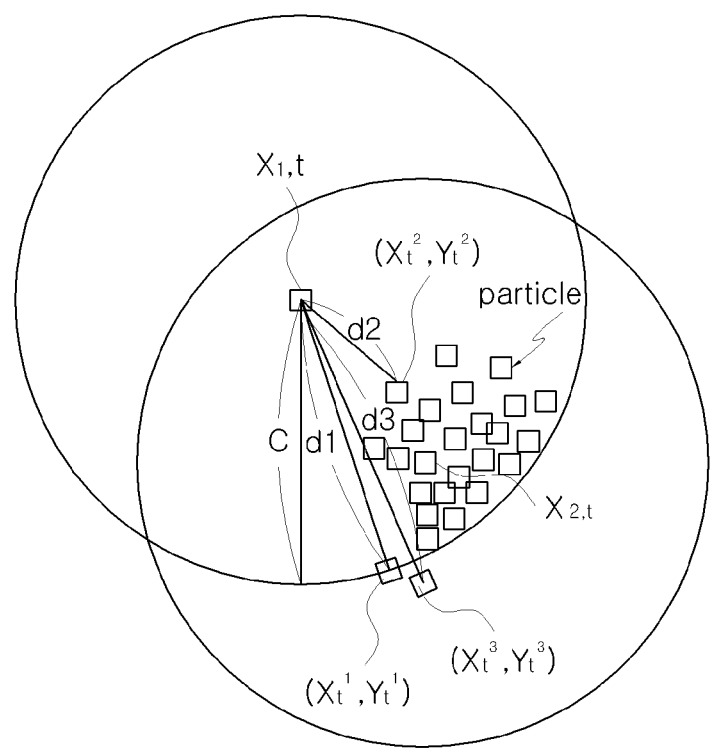
FIG. 4 is a diagram illustrating penalties in the method for tracking multiple image objects according to one embodiment of the present invention.

FIG. 4 illustrates an example of calculating the penalties of the particles of the second image object $X_{2,t}$. Referring to FIG. 4, the penalties are values between "0" and "1". The penalties of the particles of the second image object $X_{2,t}$ are calculated as inversely proportional to the distances to the first image object $X_{1,t}$, which is the neighboring image object of the second image object $X_{2,t}$.

That is, among the particles of the second image object $X_{2,t}$, a first particle $(x_t^1, y_t^1)$ that is within the threshold distance C from the first image object $X_{1,t}$ has a penalty of "1" because the distance d1 to the first image object $X_{1,t}$ is equal to the threshold distance C. In an extreme case, a particle that is at the same location as the first image object $X_{1,t}$ has a penalty of "0".

Furthermore, a second particle $(x_t^2, y_t^2)$ that is within the threshold distance C has a penalty that is a value between "1" and "0".

For example, when the second particle $(x_t^2, y_t^2)$ is away from the first image object $X_{1,t}$ by a distance d2 of "0.5C", the penalty of the second particle $(x_t^2, y_t^2)$ is "0.5" (i.e., 0.5C/C).

Furthermore, for a third particle $(x_t^3, y_t^3)$ that is beyond the threshold distance C, a penalty is not calculated. However, it will be apparent that the penalty of the third particle $(x_t^3, y_t^3)$ may be calculated as a value larger than "1", thereby increasing a corresponding weight.

That is, in the case of particles that are closer to a neighboring image object, a penalty close to "0" is multiplied, and thus the extent of reflection is reduced upon the image object location prediction in a current image.

Accordingly, the location of each image object having an adjacent neighboring image object is not predicted to be excessively close to the neighboring image object, and thus the hijacking phenomenon of a tracker can be prevented.

Thereafter, particles having a weight of "0" are eliminated in order to not influence the updating of the location of the image object at step S8000.

Thereafter, the location of the image object is predicted based on the locations of the particles assigned the weights, and is updated in a current image. The penalty graph G is updated based on the updated location of the image object.

In this embodiment of the present invention, the average value of the locations of all the particles assigned weights is predicted as the location of the image object in the current image, and an update is made with the average value of the locations.

However, it will be apparent that the average value of the locations of particles having weights equal to or higher than a specific value, or the value of the location of a particle having the highest weight, may be predicted as the location of the image object in the current image and an update may be made with the value.

Thereafter, the particles are resampled, thereby forming the basis of the particle set prediction in a subsequent image at step S9100.

Furthermore, the resampling of particles is a process of eliminating particles having weights equal to or lower than a specific weight, copying particles having higher weights and then making the number of particles meet the full number of particles, and thereby increases the tracking success rate upon subsequent tracking.

Thereafter, it is determined whether there is an input for a subsequent image at step S9200. If there is an input for a subsequent image, the process returns to step S2000 of extracting the image object and acquiring location information. If there is no input for a subsequent image, the process is terminated.

While the present invention has been described according to the embodiments as above, the present invention is not limited to the aforementioned embodiments, wherein various modifications and variations may be made by those having ordinary knowledge in the field to which the present invention pertains within ranges that do not depart from the spirit and scope of the present invention.

The method for tracking multiple image objects according to the present invention is a technology related to HCI, and may be used, without limitation, in devices using a multi-touch schemes, such as tabletop displays, smart phones, and smart TVs.

The invention claimed is:

1. A method for tracking multiple image objects, the method comprising:
   resampling particles from each of the image objects tracked in a previous image;
   calculating respective weights of the resampled particles; and
   predicting and tracking locations of the image objects in a current image based on values obtained by multiplying the locations of the particles by corresponding weights,
   wherein when an image object of the previous image has a neighboring image object located within a threshold distance, weights of the particles sampled from the image object are calculated by multiplying image values of the current image by penalties, which are values of distances between the corresponding particles and the neighboring image object.

2. The method of claim 1, wherein:
   the penalties are values between "0" and "1", penalties of particles located within the threshold distance from the neighboring image object are calculated as "1", and values of distances of particles that are superimposed on the neighboring image object at the same location are calculated as "0"; and
   penalties of particles located closer to the neighboring image object within the threshold distance are calculated as a value closer to "0".

3. The method of claim 2, wherein the location of the image object in the current image is predicted as an average value of locations that are obtained by multiplying the locations of the particles by the corresponding weights.

4. The method of claim 2, further comprising, after tracking the locations of the image objects in the previous image, determining whether each of the image objects has a neighboring image object within the threshold distance, and creating a penalty graph including
   a location coordinate set of first image objects, the first image objects being image objects having neighboring image objects, and
   an edge information set, the edge information being information indicating that location coordinates of the first image object have been mapped to location coordinates of the neighboring image objects of the first image objects;
   wherein the penalties for particles of the first image objects present within the location coordinate set are calculated as values of distances to the neighboring image objects designated by the edge information of the first image objects.

5. The method of claim 4, wherein the penalty graph is calculated using the following Equations:

$$G=(V,E)$$

$$V=\{X_{1,t},X_{2,t},X_{3,t},X_{4,t}\}$$

$$E=\{(X_{1,t},X_{2,t}),(X_{3,t},X_{4,t})\}$$

where G is the penalty graph, V is a location coordinate set, E is an edge information set, $X_{j,t}$ is the first image object, and $x_{i,t}$ is the neighboring image object.

6. The method of claim 4, further comprising, after tracking the locations of the image objects in the current image, updating the penalty graph with respect to the tracked image objects and then using the updated penalty graph as a basis of the calculation of the penalties upon tracking the locations of the image objects in a subsequent image.

7. A non-transitory computer-readable medium having a multiple image object-tracking program stored thereon, the multiple image object tracking program performing the method for tracking multiple image objects set forth in claim 1 by enabling a computer to function.

8. A server system having the non-transitory computer-readable medium having the multiple image object-tracking program of claim 7 stored thereon, the server system transmitting the multiple image object tracking program over a communication network.

9. A computer system having the non-transitory computer-readable medium having the multiple image object-tracking program of claim 7 installed thereon, the computer system performing the method for tracking multiple image objects.

* * * * *